(12) United States Patent
Pomish

(10) Patent No.: US 11,498,374 B2
(45) Date of Patent: Nov. 15, 2022

(54) DYNAMIC LATERAL TRAILER HITCH POSITIONING SYSTEM

(71) Applicant: Toyota Motor Engineering & Manufacturing North America, Inc., Plano, TX (US)

(72) Inventor: Ethan W. Pomish, Livonia, MI (US)

(73) Assignee: TOYOTA MOTOR ENGINEERING & MANUFACTURING NORTH AMERICA, INC., Plano, TX (US)

(*) Notice: Subject to any disclaimer, the term of this patent is extended or adjusted under 35 U.S.C. 154(b) by 201 days.

(21) Appl. No.: 16/932,402

(22) Filed: Jul. 17, 2020

(65) Prior Publication Data
US 2022/0016947 A1    Jan. 20, 2022

(51) Int. Cl.
*B60D 1/44*       (2006.01)
*B60D 1/24*       (2006.01)

(52) U.S. Cl.
CPC .............. *B60D 1/44* (2013.01); *B60D 1/246* (2013.01)

(58) Field of Classification Search
CPC ........................................................ B60D 1/44
See application file for complete search history.

(56) References Cited

U.S. PATENT DOCUMENTS

| | | | |
|---|---|---|---|
| 4,440,417 A * | 4/1984 | Kirchner | B60D 1/40 280/491.1 |
| 5,660,409 A * | 8/1997 | Hensley | B60D 1/30 280/492 |
| 6,443,475 B1 * | 9/2002 | Fegley | B60D 1/44 280/468 |
| 7,054,731 B1 * | 5/2006 | Lange | A01B 69/008 701/50 |
| 8,091,913 B1 * | 1/2012 | White | B60D 1/06 280/468 |
| 8,226,106 B2 * | 7/2012 | Hensley | B60D 1/065 280/491.5 |
| 8,678,420 B2 * | 3/2014 | Gallego | B60D 1/62 280/446.1 |
| 8,905,424 B2 * | 12/2014 | Williams, Jr. | B60D 1/465 280/479.1 |
| 9,796,226 B2 * | 10/2017 | Turner | B60D 1/246 |
| 9,873,300 B1 * | 1/2018 | Gramlow | A01B 69/003 |
| 9,913,422 B2 | 3/2018 | Mitchel et al. | |
| 10,308,086 B2 * | 6/2019 | Tiainen | B60D 1/44 |
| 10,821,790 B2 * | 11/2020 | Shaeff | B60D 1/52 |
| 2002/0089147 A1 * | 7/2002 | Shilitz | B60D 1/36 280/470 |
| 2003/0132605 A1 * | 7/2003 | Wiers | B60D 1/18 280/468 |

(Continued)

FOREIGN PATENT DOCUMENTS

FR      2646812 A1      11/1990

*Primary Examiner* — Kevin Hurley
(74) *Attorney, Agent, or Firm* — Snell & Wilmer LLP

(57) ABSTRACT

Methods and systems for adjusting a trailer attached to a vehicle. The system includes a hitch of the vehicle located on a track along a rear end of the vehicle and configured to couple the vehicle to the trailer and move along the track. The system also includes one or more actuators coupled to the hitch and configured to move the hitch along the track. The system also includes an electronic control unit (ECU) configured to instruct the one or more actuators to move the hitch along the track.

19 Claims, 7 Drawing Sheets

(56) References Cited

U.S. PATENT DOCUMENTS

| | | | | |
|---|---|---|---|---|
| 2003/0137126 A1* | 7/2003 | Reuter | ............... | B60D 1/44 |
| | | | | 280/479.1 |
| 2004/0021292 A1* | 2/2004 | Abair | ............... | B60D 1/246 |
| | | | | 280/456.1 |
| 2016/0366812 A1* | 12/2016 | Mitchel | ............ | A01B 59/043 |
| 2022/0016947 A1* | 1/2022 | Pomish | ............ | B60D 1/246 |

* cited by examiner

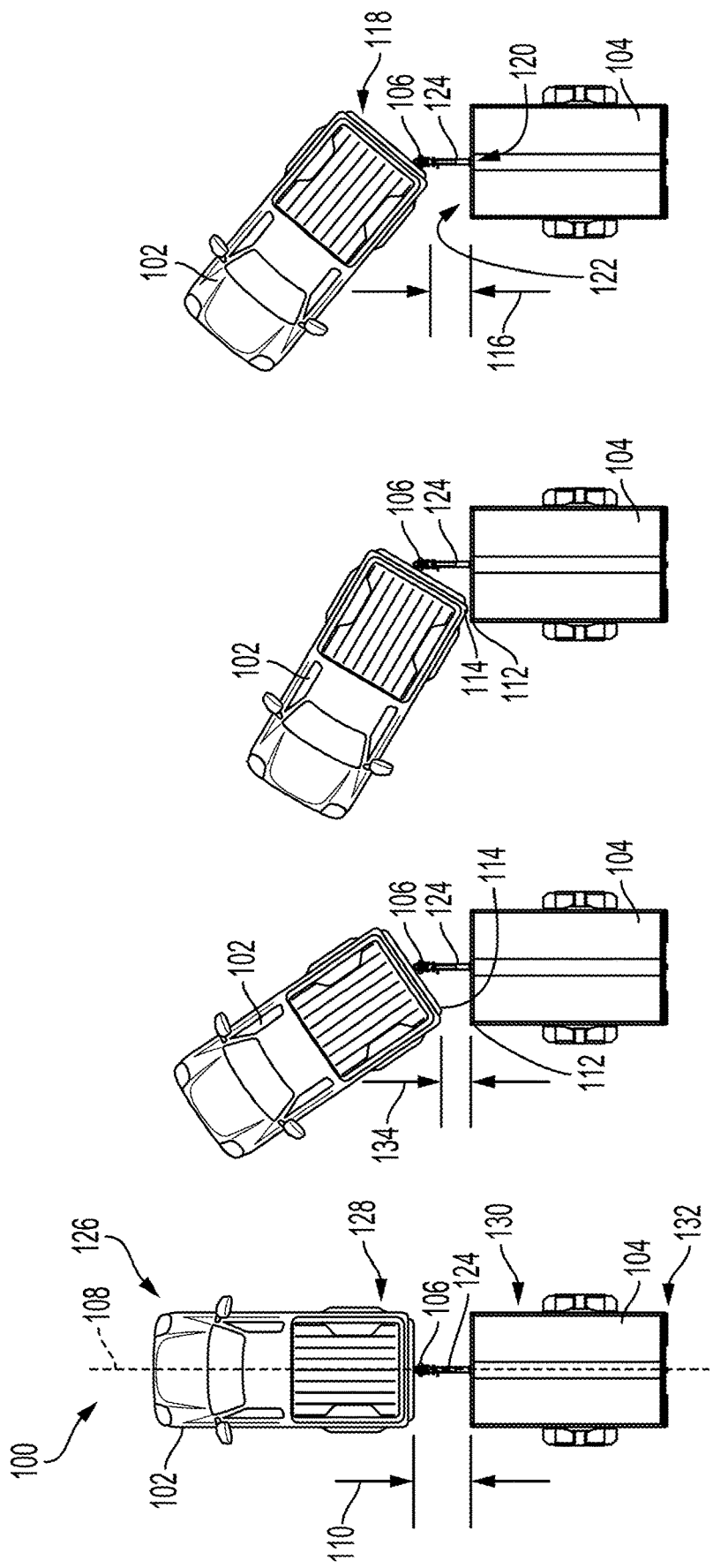

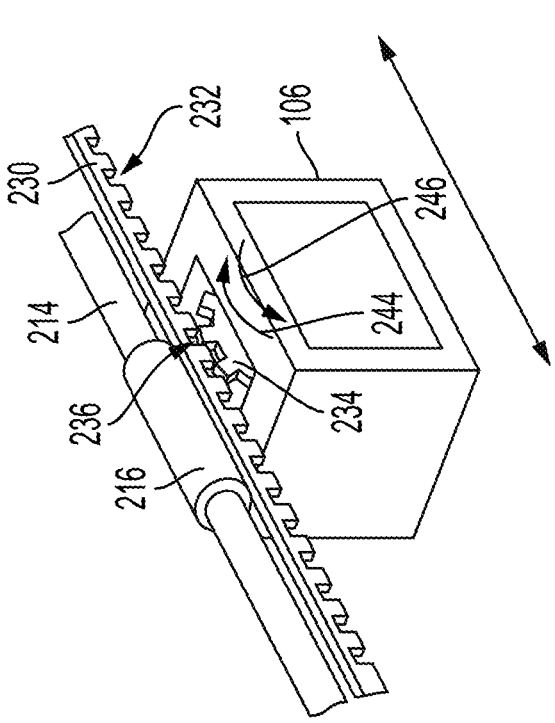
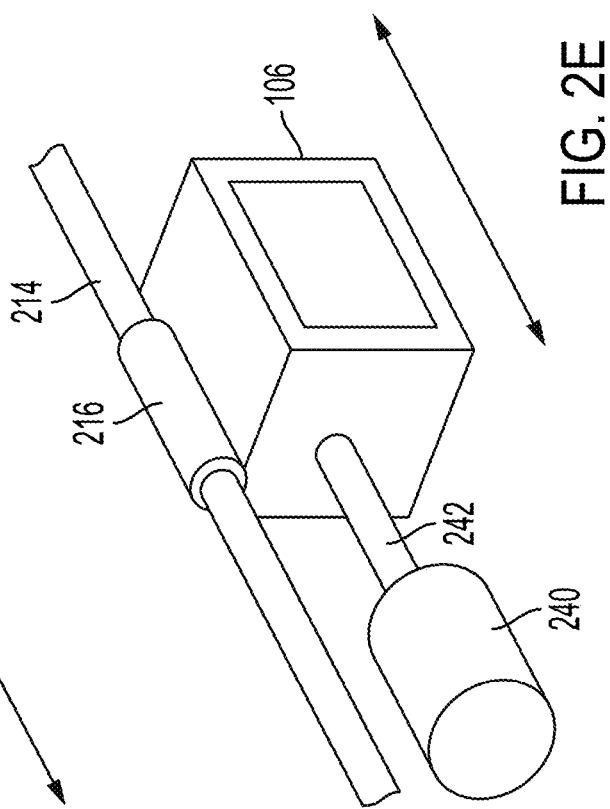
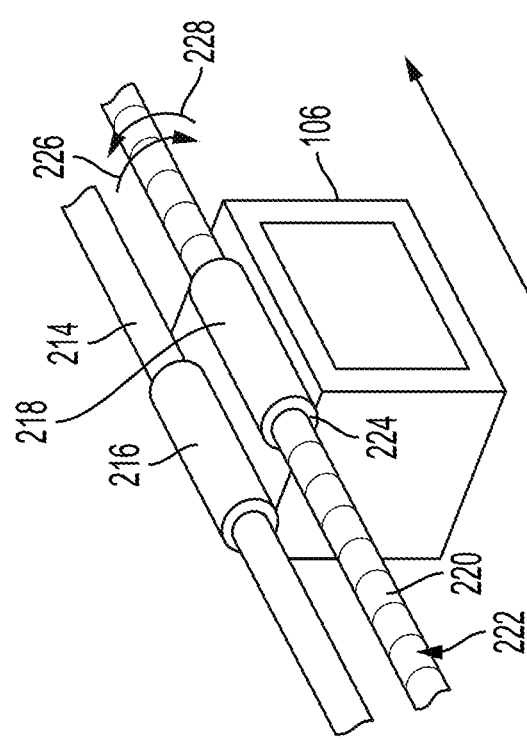

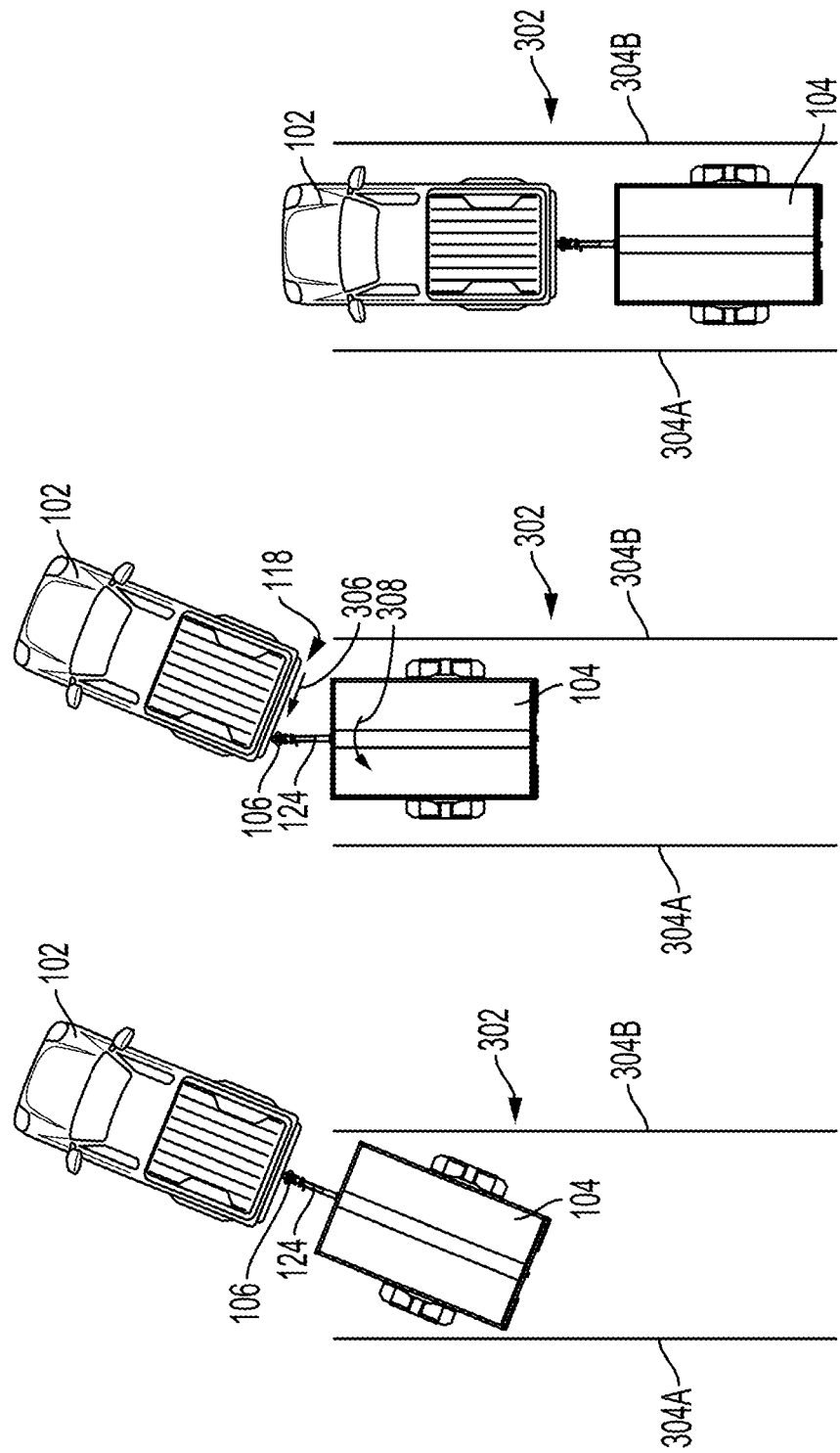

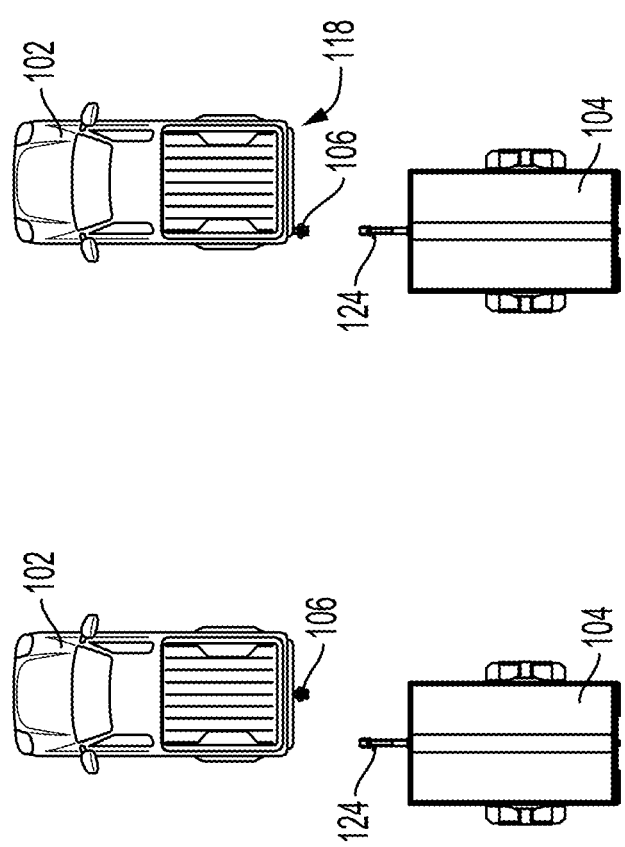

DYNAMIC LATERAL TRAILER HITCH POSITIONING SYSTEM

BACKGROUND

1. Field

This specification relates to a system and a method for dynamically adjusting the position of a trailer hitch of a vehicle.

2. Description of the Related Art

Vehicles, such as trucks or sport utility vehicles, for example, may include a trader hitch located at a rear end of the vehicle. A trailer may be attached to the trailer hitch and the trailer may be pulled by the vehicle. Cargo that may not fit within the vehicle may be stored on the trailer. The trailer may be enclosed, covering the cargo of the trailer, or the trailer may be open, exposing the cargo of the trailer to the outside environment.

The trailer may have a frame, multiple wheels, a tongue extending outward from the front end of the trailer, and a coupler attached to the tongue. The coupler may mate with the trailer hitch to connect the trailer to the vehicle. The trailer may pivot relative to the vehicle at the connection of the trailer hitch and the coupler. The combined vehicle and trailer may have a significantly wide turning radius. In some situations, a rear portion of the vehicle may make contact with a front portion of the trailer when the vehicle attempts certain turning maneuvers. These limitations affect the ease of operating a vehicle with a connected trailer. Thus, there is a need for an improved trailer system.

SUMMARY

What is described is a system for adjusting a trailer attached to a vehicle. The system includes a hitch of the vehicle located on a track along a rear end of the vehicle and configured to couple the vehicle to the trailer and move along the track. The system also includes one or more actuators coupled to the hitch and configured to move the hitch along the track. The system also includes an electronic control unit (ECU) configured to instruct the one or more actuators to move the hitch along the track.

Also described is a vehicle coupled to a trailer. The vehicle includes a hitch located on a track along a rear end of the vehicle and configured to couple the vehicle to the trailer and move along the track. The vehicle also includes one or more actuators coupled to the hitch and configured to move the hitch along the track. The vehicle also includes an electronic control unit (ECU) configured to instruct the one or more actuators to move the hitch along the track.

Also described is a method for adjusting a trailer attached to a vehicle. The method includes detecting, by one or more sensors of the vehicle, sensor data indicating a location and an orientation of the trailer relative to the vehicle. The method also includes determining, by an electronic control unit (ECU) of the vehicle, an ideal hitch location based on the sensor data. The method also includes instructing, by the ECU, one or more actuators to move the hitch located on a track along a rear end of the vehicle to the ideal hitch location.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale, and may be exaggerated to better illustrate the important features of the present invention.

FIGS. 1A-1D illustrate a vehicle with a trailer, according to various embodiments of the invention.

FIGS. 2D-2F illustrate various mechanisms for moving the hitch, according to various embodiments of the invention.

FIGS. 3A-3C illustrate alignment of a trailer into a parking space using the dynamic lateral trailer hitch positioning system, according to various embodiments of the invention.

FIGS. 4A-4B illustrate alignment of a trailer with the vehicle using the dynamic lateral trailer hitch positioning system, according to various embodiments of the invention.

DETAILED DESCRIPTION

Figure 2C:
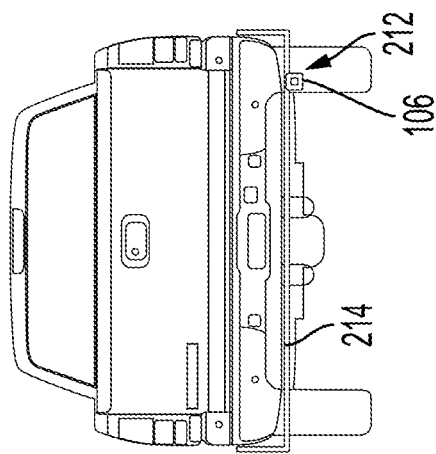
FIGS. 2A-2C illustrate a rear view of a vehicle with the dynamic lateral trailer hitch positioning system, according to various embodiments of the invention.

Disclosed herein are systems, vehicles, and methods for adjusting a trailer attached to a vehicle. The systems and methods described herein use one or more actuators connected to a hitch of a vehicle to move the attached trailer. By moving the hitch of the vehicle laterally (widthwise relative to the vehicle), any potential collisions between the vehicle and the trailer may be avoided. In addition, by moving the hitch of the vehicle laterally, the trailer may be rotated relative to the ground, allowing for alignment of the trailer with a parking space. Moving the hitch of the vehicle may also ease the process of aligning the trailer and the vehicle for coupling the tongue of the trailer with the hitch of the vehicle.

Conventional vehicles have hitches located at a lengthwise centerline axis along the rear end of the conventional vehicles, and the hitches of conventional vehicles do not move. In addition, trailers have tongues that couple to the hitches of conventional vehicles, and the tongues are located at a lengthwise centerline axis of the trailer and extend outward from the trailer at a front end of the trailer. Since the tongues of trailers and hitches of conventional vehicles do not move, in conventional vehicles, there is a possibility of collision between the vehicle and the trailer when the vehicle makes turns. The systems and methods describe herein prevent (or mitigate) these collisions.

The systems and methods described herein improve the safety of vehicles by avoiding collisions between the vehicle and the trailer. In some situations, a collision between the vehicle and the trailer may cause loss of control of the vehicle by the driver, putting the safety of the vehicle occupants and the safety of other vehicles' occupants at risk.

As used herein, "driver" may refer to a human being driving the vehicle when the vehicle is a non-autonomous vehicle, and/or "driver" may also refer to one or more computer processors used to autonomously or semi-autonomously drive the vehicle. "User" may be used to refer to the driver or occupant of the vehicle when the vehicle is a non-autonomous vehicle, and "user" may also be used to refer to an occupant of the vehicle when the vehicle is an autonomous or semi-autonomous vehicle.

FIGS. 1A-1D illustrate a vehicle using the dynamic lateral, trailer hitch positioning system with a trailer. The vehicle 102 may be any vehicle configured to couple to a trailer 104. For example, the vehicle 102 may be a truck, a sport utility vehicle, an all-terrain vehicle, or a tractor. The vehicle 102 has a front end 126 and a rear end 128. The vehicle 102 may have a hitch (or trailer hitch) 106 located at a rear end 128. The hitch 106 may have a channel (e.g., a square-shaped channel) for receiving a mount (e.g., a ball mount). The mount may be secured to the hitch 106 via a retainer (e.g., a pin). As used herein, "hitch" or "trailer hitch" may refer to the channel for receiving the mount alone or may also refer to the channel and the mount together. The hitch 106 may be coupled to the frame of the vehicle 102 and is capable of mating with an object (e.g., a trailer) to couple the object to the vehicle 102.

The trailer 104 may be any object capable of receiving cargo and being pulled by the vehicle 102. The trailer 104 may be covered or uncovered. The trailer 104 may have multiple wheels for traversing roads or paths.

The trailer 104 has a front end 110 and a rear end 132. The trailer 104 has a tongue 124 located at the front end 130 and extending outward from the front end 130. The tongue 124 may have a coupler located at the tip end of the tongue 124. The coupler is coil figured to mate with the hitch 106. For example, when the hitch 106 includes a ball, the ball may be received and secured by the coupler to maintain the connection between the hitch 106 and the tongue 124, and more broadly, the connection between the vehicle 102 and the trailer 104.

Conventional hitches are located along a lengthwise centerline axis of the vehicle. Similarly, conventional tongues are located along a lengthwise centerline axis of the trailer. Thus, conventional hitches and tongues (as well as conventional vehicles and trailers) are aligned with a centerline axis 108, as shown in FIG. 1A. As will be shown herein, by contrast, the hitch 106 of the vehicle 102 is capable of lateral movement.

As shown in FIG. 1A, when the hitch 106 of the vehicle 102 lies along the centerline axis 108, the rear end 128 of the vehicle 102 is separated from the front end 130 of the trailer 104 by a first distance 110.

As shown in FIG. 1B, when the vehicle 102 turns to the left, the rear left corner 114 of the vehicle 102 approaches the front left corner 112 of the trailer 104. This distance is shown as the second distance 134, which is smaller than the first distance 110.

As shown in FIG. 1C, as the vehicle 102 turns further to the left, the rear left corner 114 of the vehicle 102 fluffier approaches the front left corner 112 of the trailer 104. When the vehicle 102 turns sufficiently to the left, the rear left corner 114 of the vehicle 102 may contact the front left corner 112 of the trailer 104. In order to avoid this contact, the hitch 105 may move laterally widthwise relative to the vehicle 102.

FIG. 1D shows the hitch 106 shifted to the left along the rear end 118 of the vehicle 102. The tongue 124 remains connected to the front end 130 of the trailer 104 at a central location 120. When the hitch 106 shifts to the left, a distance between the vehicle 102 and the trailer 404 can be increased, as shown by the third distance 116. The length of the tongue 124 and the length of the hitch 106 may be unchanged. In some embodiments, the hitch 106 and/or the tongue 124 may be capable of extending further outward based on the relative positions or orientations of the hitch 106, the tongue 124, the vehicle 102, and/or the trailer 104.

The hitch 106 may shift in position temporarily to provide the appropriate clearance between the vehicle 102 and the trailer 104 during the turning maneuver, as shown in FIG. 1D. When the turning maneuver is completed, the hitch 106 may return to its baseline position at the widthwise center of the vehicle, as shown in FIG. 1A.

The determination of whether the turning maneuver has been completed may be made based on the relative positions and orientations of the vehicle 102 and the trailer 104. For example, when an angle formed by the intersection of the lengthwise centerline axis of the vehicle 102 and the lengthwise centerline axis of the trailer 104 exceeds a threshold angle, the vehicle 102 may determine that the turning maneuver has been completed.

Alternatively or in addition, the determination of whether the turning maneuver has been completed may be made based on a detected speed of the vehicle 102. For example, when a detected vehicle speed of the vehicle 102 exceeds a vehicle speed threshold, the vehicle 102 may determine that the turning maneuver has been completed, as it may not be realistically possible to exceed the vehicle speed threshold while driving at an angle.

The vehicle 102 use sensor data to determine the exact location to shift the hitch 106 to, along the rear end 128 of the vehicle 102. This determination of ideal location (or "target location") may be made prior to moving the hitch 106. Adjustments to the hitch 106 location may be made as updated sensor data is detected.

In some embodiments, a display (e.g., part of an infotainment unit or an instrument panel) within the passenger cabin of the show location of the hitch 106 on an on-screen graphic when it is moved. The relative location and orientation of the vehicle and the trailer may be shown.

The hitch 106 may shift preemptively in anticipation of a particular turn based on map data, location data, and sensor data the relative location and orientation of the vehicle and the trailer 104. For example, the vehicle 102 may use map data and location data to determine that the vehicle 102 is approaching a turn, and sensor data (e.g., vehicle speed data) assay be used to determine that the vehicle will be unable to a negotiate the turn without contacting the trailer 104. In this example, the vehicle 102 may preemptively move the hitch 106 before the turn is reached to allow for sufficient time move the hitch 106 to avoid contact between the vehicle and the trailer 104.

Figure 2B:
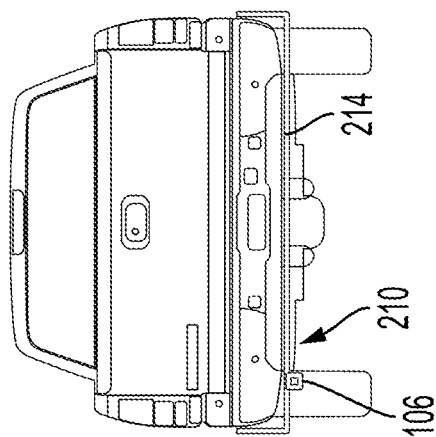
Figure 2A:
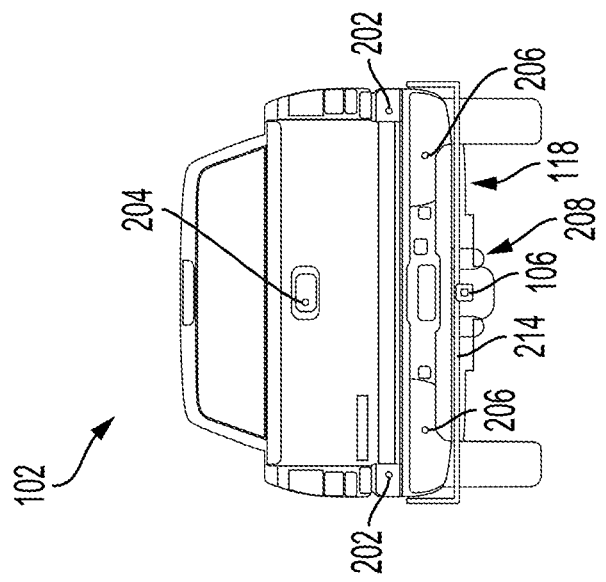

FIGS. 2A-2C illustrate a rear end 118 of the vehicle 102. The hitch 106 may be located below a bumper the vehicle 102 or along a bumper of the vehicle 102. The hitch 106 may be located along a track 214 that spans a width (or a substantial width) of the vehicle 102. The hitch 106 may travel laterally along the track 214. As shown in FIG. 2A, the hitch 106 may have a baseline position 208 at a center of the track 214, aligned with the lengthwise centerline axis of the vehicle 102. As shown in FIG. 2B, the hitch 106 may move to a left position 210 to the left of the baseline position 208. As shown in FIG. 2C, the hitch 106 may move to a right position 212 to the right of the baseline position 208.

The hitch 106 may move along the track 214 in any number of ways, some of which are shown in FIGS. 2D-2F. As shown in FIG. 2D, in some embodiments, in addition to the track 214, there may also be a corresponding parallel rail 220 with a plurality of threads 222 along the length of the rail (spanning the width of the vehicle 102). The hitch 106 may be connected to a first sleeve 216 configured to receive the track 214 and a second sleeve 218 configured to receive the rail 220. The second sleeve 218 may have corresponding threads located on an inner surface 224 of the second sleeve 218. The second sleeve 218 may receive the rail 220 such that the threads of the rail and the threads of the sleeve are engaged. An actuator coupled to the hitch 106 may rotate the second sleeve 218 in a first direction 226 or a second direction 228 to move the hitch 106 along the rail 220 (and along the track 214) or an actuator coupled to the rail 220 may rotate the rail 220 in a first direction 226 or a second direction 228 to move the hitch 106 along the track 214.

As shown in FIG. 2E, in other embodiments, a pneumatic or hydraulic cylinder 240 may be used to move the hitch 106 along the track 214. The hitch 106 may include a sleeve 216 configured to receive the track 214. The hitch 106 may be coupled to the pneumatic or hydraulic cylinder 240 by an arm 242. The arm 242 may be located parallel to the track 214 and may have a maximum length of at least the width of the vehicle 102. The arm 242 may have a variable length based on a pressure within the pneumatic or hydraulic cylinder 240. This pressure may be adjusted to, adjust the length of the arm 242, and therefore the position of the hitch 106 along the track 214. The arm 242 may be a self-collapsing and self-deploying arm capable of having its length adjusted.

As shown in FIG. 2F, in yet other embodiments, in addition to the track 214, there may also be a corresponding parallel rail 230 with a plurality of teeth 232 located along the length of the rail (spanning the width of the vehicle 102), and the hitch 106 may be connected to a gear 234 with corresponding teeth 236. The teeth 236 of the gear 234 may mesh with the teeth 232 of the rail 230. An actuator coupled to the hitch 106 and the gear 234 may rotate the gear 234 in a first direction 244 or a second direction 246 to move the hitch 106 along the track 214. A sleeve 216 coupled to the hitch 106 is configured to receive the track 214 and allows the hitch 106 to slide along the track 214.

While threads, toothed gears, and pneumatic or hydraulic cylinders are described herein, any other method or device for adjusting the location of the hitch 106 along the track 214 may be used.

Referring back to FIG. 2A, a plurality of sensors are shown. The sensors are configured to detect sensor data used to determine the relative position and orientation of the vehicle 102 and the trailer 104. The sensor data regarding the relative position and orientation of the vehicle 102 and the trailer 104 may be used as a factor in determining an ideal hitch position (or "target hitch position"). For example, when the sensor data indicates that the front left corner of the trailer 104 is approaching the rear left corner of the vehicle 102, the ideal hitch position may be determined as being left of the baseline position 208. The ideal hitch position may be further specified based on a rate that the front left corner of the trailer 104 is approaching the rear left corner of the vehicle 102. For example, when the front left corner of the trailer 104 is approaching the rear left corner of the vehicle 102 rapidly, the ideal hitch position may be farther to the left end of the track 214 than if front left corner of the trailer 104 is approaching the rear left corner of the vehicle 102 at a slower rate. The ideal hitch position may be updated in real time based on updated sensor data received in real time.

The sensors may include rear corner sensors 202 (e.g., rear corner RADAR or LIDAR sensors) configured to detect proximity of the trailer 104 to the respective rear corner of the rear corner sensors 202. The rear corner sensors 202 may also be configured to detect an orientation of the trailer 104 relative to the vehicle 102. For example, the rear corner sensors 202 may detect a plurality of reference locations, of the trailer 104 and the detection of these reference locations, and comparison to baseline values may be used to determine the orientation of the trailer 104 relative to the vehicle 102. The rear corner sensors may be located on or near the rear bumper of the vehicle 102.

The sensors may also include a rear-view camera (or image sensor) 204 configured to detect image data of the environment behind the vehicle 102. The rear-view camera 204 may also be used to display the environment behind the vehicle 102 to the driver to assist the driver in maneuvering the vehicle while parking the vehicle 102. The detected image data from the rear-view camera 204 may be analyzed and used to determine proximity of the trailer 104 to the vehicle 102 as well as orientation of the trailer 104 relative to the vehicle 102. For example, reference locations of the trailer 104 may be detected based on analysis of the image data, and the detection of these reference locations and comparison to baseline values may be used to determine the orientation of the trailer 104 relative to the vehicle 102 and may also be used to determine a proximity of the trailer 104 to the vehicle 102. The rear-view camera 204 may be located adjacent to a handle for opening a trunk or tailgate of the vehicle 102. The rear-view camera may be one or more cameras.

The sensors may also include rear parking clearance sensors 206 (e.g., rear RADAR or LIDAR sensors) configured to detect proximity of the trailer 104 to the rear of the vehicle 102. When there are multiple rear parking clearance sensors 206, they may be configured to detect proximity of the trailer 104 to the respective rear parking clearance sensor 206. The rear parking clearance sensors 206 may also be configured to detect an orientation of the trailer 104 relative to the vehicle 102. For example, the rear parking clearance sensors 206 may detect a plurality of reference locations of the trailer 104 and the detection of these reference locations and comparison to baseline values may be used to determine the orientation of the trailer 104 relative to the vehicle 102. The rear parking clearance sensors 206 may also be used to provide feedback to the driver of the vehicle 102 regarding distance between the rear of the vehicle and an object behind the vehicle.

The sensors may also include an angle detection sensor configured to detect an angle of the trailer 104 relative to the vehicle 102. The angle detection sensor may be an image sensor, or a spatial detection sensor (e.g., RADAR or LIDAR), for example. The angle detection sensor may detect a plurality of reference locations of the trailer 104 and the detection of these reference locations and comparison to baseline values may be used to determine the angle of the trailer 104 relative to the vehicle 102. The detected angle may correspond to the angle formed between the lengthwise centerline axis of the vehicle 102 compared to the lengthwise centerline axis of the trailer 104. Thus, an angle of 0 degrees would indicate that the vehicle 102 and the trailer 104 are aligned, and an angle of 90 degrees would indicate that the vehicle 102 and the trailer 104 are perpendicular to each other. In some embodiments, a positive angle value may indicate that the trailer 104 is angled to the left of the vehicle 102 and a negative angle value may indicate that the trailer 104 is angled to the right of the vehicle 102, or vice versa. In other embodiments, all detected angle values are positive, and an additional indication of left or right may be provided to indicate whether the trailer 104 is angled to the left or right of the vehicle 102.

In yet other embodiments, the detected angle may correspond to the angle formed by the lengthwise centerline axis of the trailer 104 and the track 214, such that a detected angle of 90 degrees indicated that the vehicle 102 and the trailer 104 are aligned. In these embodiments, acute angles may indicate that the trailer 104 is angled to the left of the vehicle 102 and obtuse angles may indicate that the trailer 104 is angled to the right of the vehicle 102, or vice versa.

While the sensors 202, 204, 206 are shown in FIGS. 2A-2C as being in particular locations, in some embodiments, the sensors 202, 204, 206 may be located at any location on the vehicle 102.

In addition to sensors used to determine the relative position and orientation of the vehicle 102 and the trailer 104, additional sensors may be used by the vehicle 102. The vehicle 102 may also include a vehicle speed sensor configured to detect a ground speed of the vehicle 102. In some embodiments, the vehicle speed sensor is a vehicle wheel speed sensor. The around speed of the vehicle 102 may be used as a factor in determining an ideal hitch position. For example, if the ground speed of the vehicle 102 exceeds a vehicle speed threshold, the ideal hitch position is the baseline position 208. In another example, during a turn at lower vehicle ground speeds, the ideal hitch location may be farther to the left or right end of the track 214, and during a turn at higher vehicle ground speeds, the ideal hitch location may be closer to the baseline position (at the lengthwise centerline axis of the vehicle 102). More pronounced adjustments to the trailer 104 positioning can be made at lower speeds.

FIGS. 3A-3C illustrate a process of aligning the trailer to a parking space. In many situations, parking a vehicle 102 with a trailer 104 attached, in reverse, into a parking space 302 may be difficult. In various embodiments, the hitch 106 may be moved to align the trailer 104 with the parking space 302, making the parking process easier for the driver.

As shown in FIG. 3A, the vehicle 102 has a trailer 104 attached, as described herein. The hitch 106 of the vehicle 102 is coupled to the tongue 124 of the trailer 104 (e.g., by a coupler of the trailer 104 at front tip of the tongue 124). The driver of the vehicle 102 may desire to maneuver the vehicle 102 and the trailer 104 into the parking space 302, denoted by a first line (left line) 304A and a second line (right line) 304B. The vehicle 102 and the trailer 104 are in an angled orientation with respect to the lines 304 of the parking space 302, making parking the vehicle 102 and the trailer 104 a challenge for the driver.

As shown in FIG. 3B, the hitch 106 may be moved to the left, along the rear end 118 of the vehicle 102. When the hitch 106 is moved in the left direction 306, and the tongue 124 of the trailer 104 remains in the central location along the front end of the trailer 104, the trailer 104 rotates in a direction 308. By moving the hitch 106, the trailer 104 can be aligned with the lines 304 of the parking space 302.

In some embodiments, the vehicle 102 uses sensors described herein to detect the lines 304, the orientation of the trailer 104, and the orientation and positioning of the vehicle 102 relative to the trailer 104. Using this detected data, the vehicle 102 is able to determine a hitch position that results in the trailer 104 being aligned with the lines 304. The vehicle 102 may automatically move the hitch 106 to align the trailer 104 with the lines 304. In some embodiments, an input device (e.g., a button, knob, touchscreen icon on a display) receives a user input for controlling the location of the hitch 106, and the user (e.g., the driver) may manually (via the input device and one or more actuators) adjust the location of the hitch 106 to align the trailer 104 with the lines 304. The user may view the lines 304 and the trailer 104 using a display within the vehicle 102 and one or more image sensors and/or spatial sensors (e.g., RADAR or LIDAR) located on the rear of the vehicle 102.

As shown in FIG. 3C once the trailer 104 is aligned with the lines 304, the vehicle 102 may be driven in reverse and in between the lines 304, such that the vehicle 102 and the trailer 104 are both aligned with the lines 304. The hitch 106 may automatically move to the baseline position as the vehicle 102 reverses into the parking space 302, while maintaining the alignment of the trailer 104 with the lines 304.

In some embodiments, when the vehicle 102 is capable of being operated autonomously, the process shown in FIGS. 3A-3C and described herein may be performed automatically by the vehicle 102 and without human intervention.

As used herein, the trailer 104 (or vehicle 102) being aligned with the lines 304 may mean a left side of the trailer 104 (or vehicle 102) is the same distance away from the left line 304A as the right side of the trailer 104 (or vehicle 102) is away from the right line 304B. The trailer 104 (or vehicle 102) being aligned with the lines 304 may also mean a lengthwise centerline axis of the trailer 104 (or vehicle 102) is substantially parallel with at least one of the lines 304. The trailer 104 (or vehicle 102) being aligned with the lines 304 may also mean that at least one of the left side of the trailer 104 (or vehicle 102) is substantially parallel with the left line 304A or the right side of the trailer 104 (or vehicle 102) is substantially parallel with the right line 304B.

FIGS. 4A-4B illustrate a process of a vehicle 102 aligning with a trailer 104. More specifically, the process of aligning the hitch 106 of the vehicle 102 with the tongue 124 of the trailer 104 is shown.

FIG. 4A illustrates a vehicle 102 having a hitch 106 and a trailer 104 having a tongue 124, as described herein. The vehicle 102 and the trailer 104 are not aligned. That is, the lengthwise centerline axis of the vehicle 102 is not aligned with the lengthwise centerline axis of the trailer 104. Accordingly, the hitch 106 in the baseline position and the tongue 124 are not aligned.

Conventionally, when a vehicle and a trailer are in a situation where they are not aligned, the vehicle or the trailer would be moved to place the vehicle and the trailer in alignment. However, it may be cumbersome and difficult to shift a large vehicle or a heavy trailer by precise, oftentimes small, distances.

Using the systems and methods described herein, neither the vehicle 102 nor the trailer 104 may be moved in order to align the hitch 106 and the tongue 124. FIG. 4B illustrates the hitch 106 moving to the left side, as described herein, to align with the tongue 124. In some embodiments, the hitch 106 moves along the rear end 118 of the vehicle 102 until the hitch 106 is able to make contact with a coupler located on the tongue 124 of the trailer 104.

In some embodiments, the vehicle 102 uses sensor data from various sensors (e.g., rear corner sensors 202, rearview camera 204, parking clearance sensors 206) to automatically identify the location of the tongue 124, automatically determine a target location of the hitch 106 along the rear end 118 of the vehicle 102 to move the hitch 106, and automatically move the hitch 106 to the target location. In other embodiments, a button or icon is engaged by a user to move the hitch 106. For example, an icon on the infotainment unit, a button on the instrument panel, or a button on the rear portion of the vehicle 102 may be engaged by a user to manually move the hitch 106 using one or more actuators. In this example, the infotainment unit or the buttons are electrically connected to the one or more actuators and instruct the one or more actuators to move the hitch 106.

Figure 5:
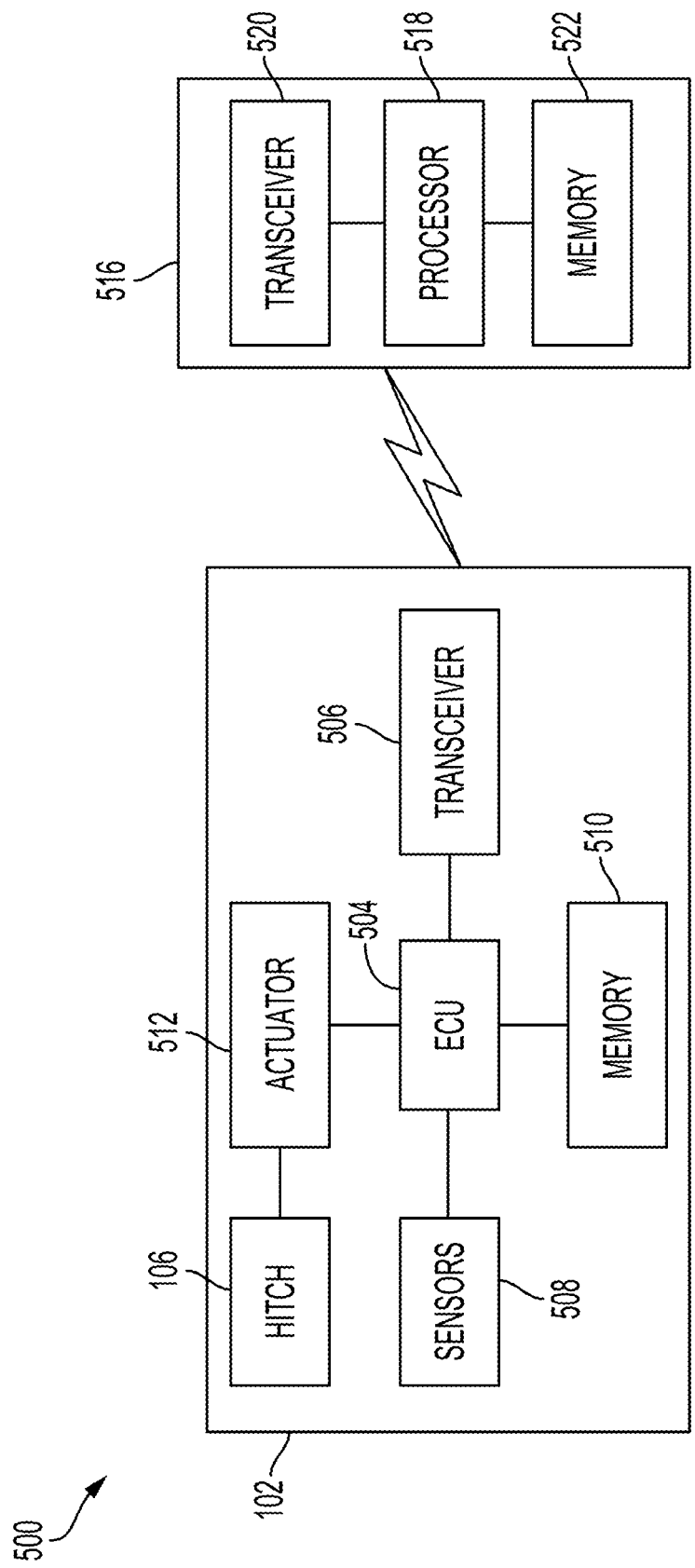
FIG. 5 illustrates the dynamic lateral trailer hitch positioning system, according to various embodiments of the invention.

FIG. 5 illustrates a block diagram of the system 500. The system 500 includes a vehicle 102 and a remote data server 516.

The vehicle 102 may have an automatic or manual transmission. The vehicle 102 is a conveyance capable of transporting a person, an object, or a permanently or temporarily affixed apparatus. The vehicle 102 may be a self-propelled wheeled conveyance, such as a car, a sports utility vehicle, a truck, a van or other motor or battery driven vehicle. For example, the vehicle 102 may be an electric vehicle, a hybrid vehicle, a plug-in hybrid vehicle, a fuel cell vehicle, or any other type of vehicle that includes a motor/generator. Other examples of vehicles include bicycles, planes, and any other form of conveyance that is capable of transportation. The vehicle 102 may be a semi-autonomous vehicle or an autonomous vehicle. That is, the vehicle 102 may be self-maneuvering and navigate without human input. An autonomous vehicle may use one or more sensors and/or a navigation unit to drive autonomously.

The vehicle 102 includes an electronic control unit (ECU) 504, a transceiver 506, sensors 508, a memory 540, at actuator 512, and a hitch 106.

Each ECU 504 may be one or more ECUs, appropriately programmed, to control, one or more operations of the vehicle. The one or more ECUs 504 may be implemented as a single ECU or in multiple ECUs. The ECU 504 may be electrically coupled to some or all of the components of the vehicle. In some embodiments, the ECU 504 is a central ECU configured to control one or more operations of the entire vehicle. In some embodiments, the ECU 504 is multiple ECUs located within the vehicle and each configured to control one or more local operations of the vehicle. In some embodiments, the ECU 504 is one or more computer processors or controllers configured to execute instructions stored in a non-transitory memory 510. The ECU 504 may utilize artificial intelligence logic and techniques to precisely determine a relative location and/or a relative orientation of a trailer 104 relative to the vehicle 102.

The vehicle 102 and one or more other vehicles similar to vehicle 102 may be coupled to a network. The network, such as a local area network (LAN), a wide area network (WAN), a cellular network, a digital short-range communication (DSRC), the Internet, or a combination thereof, connects the vehicle 102 to a remote data server 516.

The transceiver 506 may include a communication port or channel, such as one or more of a Wi-Fi unit, a Bluetooth® unit, a Radio Frequency Identification (RFID) tag or reader, a DSRC unit, or a cellular network unit for accessing a cellular network (such as 3G, 4G, or 5G). The transceiver 506 may transmit data to and receive data from devices and systems not directly connected to the vehicle. For example, the ECU 504 may communicate with the remote data server 516. Furthermore, the transceiver 506 may access the network, to which the remote data server 516 is also connected. The vehicle 102 may communicate with other vehicles directly or via a network.

The sensors 508 include sensors configured to detect sensor data associated with the trailer 104. These sensors may include rear corner sensors (e.g., rear corner sensors 202) configured to detect proximity of the trailer 104 to the respective rear corner of the rear corner sensors 202. The rear corner sensors may also be configured to detect an orientation of the trailer 104 relative to the vehicle 102, as described herein.

The sensors 508 may also include a rear-view camera (e.g., rear view camera 204) configured to detect image data of the environment behind the vehicle 102. The rear-view camera may also be used to display the environment behind the vehicle 102 to the driver to assist the driver in maneuvering the vehicle while parking the vehicle 102. The detected image data from the rear-view camera may be analyzed and used to determine proximity of the trailer 104 to the vehicle 102 as well as orientation of the trailer 104 relative to the vehicle 102, as described herein.

The sensors 508 may also include rear parking clearance sensors (e.g., rear parking clearance sensors 206) configured to detect proximity of the trailer 104 to the rear of the vehicle 102. When there are multiple rear parking clearance sensors, they may be configured to detect proximity of the trailer 104 to the respective rear parking clearance sensor. The rear parking clearance sensors may also be configured to detect an orientation of the trailer 104 relative to the vehicle 102, as described herein.

The sensors 508 may also include an angle detection sensor configured to detect an angle of the trailer 104 relative to the vehicle 102, as described herein.

The sensors 508 may also include a vehicle speed sensor configured to detect a ground speed of the vehicle 102. In some embodiments, the vehicle speed sensor is a vehicle wheel speed sensor. The ground speed of the vehicle 102 may be used as a factor in determining an ideal hitch position, as described herein.

The sensors 508 may also include a location sensor configured to detect location data associated with the vehicle 102. The location sensor may be a GPS unit or any other global location detection device. The ECU 504 may use the location data along with the map data stored in the memory 510 to determine a location of the vehicle. In other embodiments, the location sensor has access to the map data and may determine the location of the vehicle and provide the location of the vehicle to the ECU 504.

The location data may be used to anticipate any potential shifting of the hitch 106 location based on any turns, road conditions, or traffic conditions being approached by the vehicle 102, as well as the speed of the vehicle 102.

The vehicle 102 includes an actuator 512, which may be one or more actuators, configured to adjust the location of the hitch 106. In some embodiments, as described herein, the actuator 512 adjusts the location of the hitch 106 along a track (e.g., track 214) along a rear end (e.g., rear end 118) of the vehicle 102. The actuator 512 may be controlled by the ECU 504 or may have one or more processors of its own to perform the functions described herein.

The memory 510 is connected to the ECU 504 and may be connected to any other component of the vehicle. The memory 510 is configured to store any data described herein, such as the map data, the location data, vehicle data, trailer data, and any data received from the remote data server 516 via the transceiver 506. The vehicle data associated with the vehicle 102 may indicate the features, capabilities, reference points, and measurements of the vehicle 102. The trailer data associated with the trailer 104 may indicate the features, capabilities, reference points, and measurements of the trailer 104.

The ECU 504 may use the detected data from the sensors 508 to determine an ideal hitch position, and the ECU 504 may use the actuator 512 to move the hitch 106 to the Ideal hitch position. The ideal hitch position may be determined by first determining a relative location and orientation of the trailer 104 and the vehicle 102. The ECU 504 may use sensor data from various sensors (e.g., rear corner sensors, rear-view camera, rear parking clearance sensors, angle detection sensor) to determine the relative location and orientation of the trailer 104 and the vehicle 102.

The relative location of the trailer 104 and the vehicle 102 may include a distance between any two locations of the trailer 104 and the vehicle 102, such as the rear left corner 114 of the vehicle 102 and the front left corner 112 of the trailer 104. The closest distance between the trailer 104 and the vehicle 102 may be determined by the ECU 504.

The relative orientation of the trailer 104 and the vehicle 102 may include a relative positioning of the trailer 104 and the vehicle 102. The relative orientation of the trailer 104 and the vehicle 102 may be expressed in terms of relative angles of reference axes of the trailer 104 and the vehicle 102. For example, the lengthwise centerlines axis of the vehicle 102 may be compared to the lengthwise centerline axis of the trailer 104 to determine the relative orientation of the trailer 104 and the vehicle 102. In another example, the axis along the rear end 118 of the vehicle 102 may be compared to the axis along the front end 130 of the trailer 104 to determine the relative orientation of the trailer and the vehicle 102.

The ECU 504 may also use at least one of vehicle speed data, location data, road condition data, or traffic data to determine the ideal hitch position. The speed at which the vehicle 102 is travelling may affect the ideal hitch position. The higher the vehicle speed, the closer the ideal hitch position to the baseline, position at the widthwise center of the vehicle 102, along the lengthwise centerline axis of the vehicle 102.

The location of the vehicle 102 may also affect the ideal hitch position. In a first scenario, the vehicle 102 may first encounter a turn requiring movement of the hitch 106 and may then encounter a long straight path. In this scenario, the ideal hitch position may be relatively far from the baseline position as the vehicle 102 faces a long, straight road after the turn, so there is an opportunity to safely transition the hitch position to the baseline position. In a second scenario, the vehicle 102 may first encounter a sharp left turn requiring movement of the hitch 106 in the left direction and may then encounter a sharp right turn requiring movement of the hitch 106 in the right direction. The ideal hitch position may be relatively close to the baseline position, as there may not be sufficient time to move the hitch position in response to the second turn after moving the hitch position in response to the first turn. In some situations, the ECU 504 may determine that avoiding contact between the vehicle 102 and the trailer 104 is not possible, and may instead move the hitch 106 to minimize contact between the vehicle 102 and the trailer 104 to reduce damage to both the vehicle 102 and the trailer 104.

The road condition data and the traffic data may affect the ideal hitch position, as they may affect the speed of the vehicle and the maneuverability of the vehicle. For example, when road conditions are uneven terrain, such as mud or dirt, the vehicle 102 may be travelling at lower speeds. In another example, when heavy traffic is present, the vehicle 102 may also be travelling at lower speeds.

The remote data server 516 includes a processor 518, a memory 522, and a transceiver 520. The processor 518 of the remote data server 516 may be one or more computer processors configured to execute instructions stored in non-transitory memory 522. The remote data server 516 may store data, such as traffic data, road condition data, and map data in memory 522 and communicate the stored data to the vehicle 102 via the transceiver 520. While only one remote data server 516 is shown, any number of remote data servers in communication with each other may be used.

Figure 6:
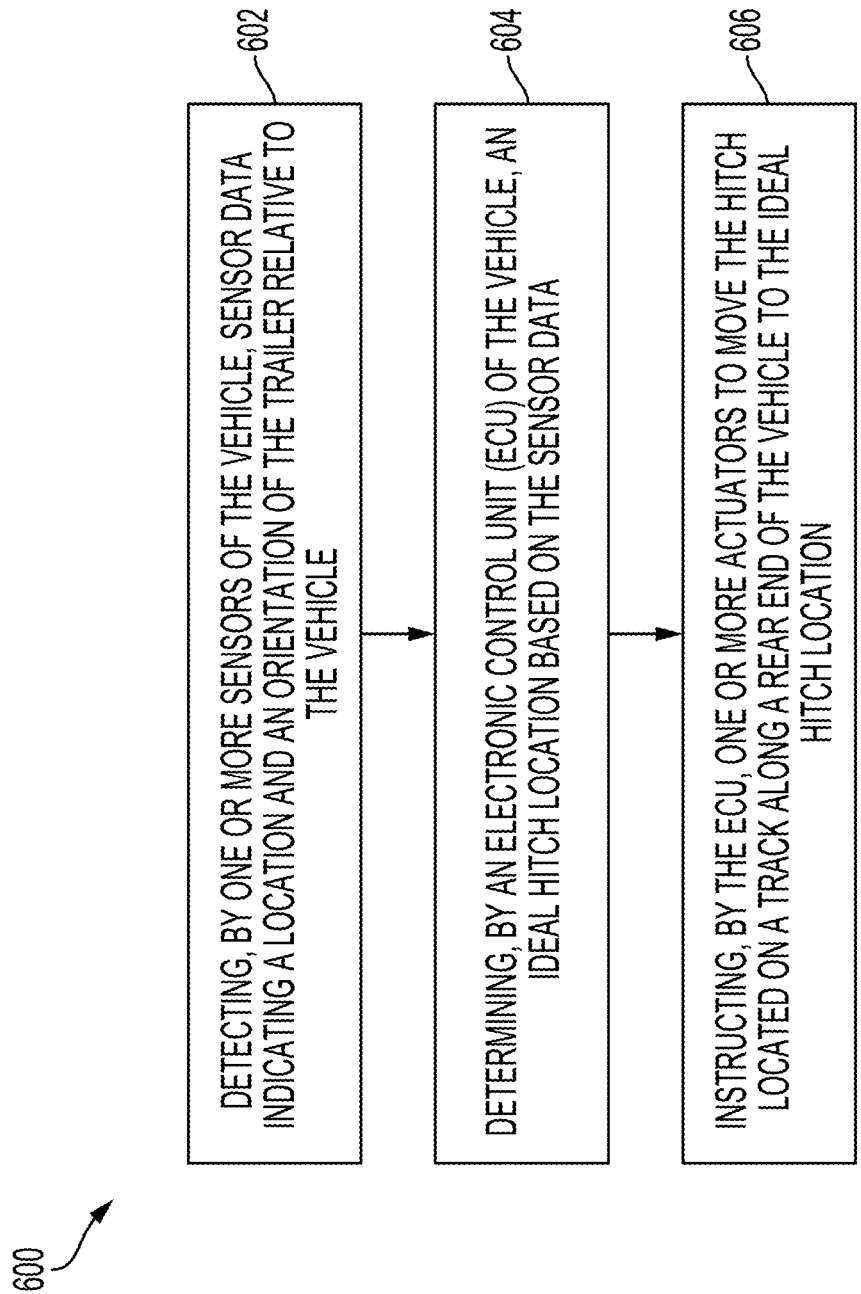
FIG. 6 illustrates a process of the system, according to various embodiments of the invention.

FIG. 6 illustrates a process 600 performed by the system described herein, for adjusting a trailer (e.g., trailer 104) attached to a vehicle (e.g., vehicle 102). As described herein, the vehicle includes a hitch (e.g., hitch 106) located along a track (e.g., track 214). The hitch may move along the track using one or more actuators (e.g., actuator 512).

One or more sensors (e.g., sensors 508) detect sensor data indicating a location and an orientation of the trailer relative to the vehicle (step 602). The one or more sensors may include rear corner sensors (e.g., rear corner sensors 202), a rear-view camera (e.g., rear view camera 204), rear parking clearance sensors (e.g., rear parking clearance sensors 206), an angle detection sensor, a vehicle speed sensor, or a location sensor, each as described herein.

An electronic control unit (ECU) (e.g., ECU 504) of the vehicle determines an ideal hitch location based on the sensor data (step 604). The ideal hitch location may be determined by identifying, by the ECU, potential contact between the vehicle and the trailer based on the sensor data and determining, by the ECU, a hitch movement to avoid the potential contact between the vehicle and the trailer. The ideal hitch location is the location of the hitch that causes the hitch movement to avoid the potential contact between the vehicle and the trailer.

For example, the sensor data may indicate that the vehicle making a right turn at a particular location at a particular speed will likely make contact with the trailer. In response, the ECU may determine an ideal hitch location to move the hitch to, in order to avoid the potential contact with the trailer.

In another example, the sensor data may indicate that the vehicle making a right turn is causing a distance between the trailer and the vehicle to rapidly narrow, and contact between the trailer and the vehicle is likely. In response, the ECU may determine an ideal hitch location to move the hitch to, in order to avoid the potential contact with the trailer.

The ideal hitch location may also be determined based on additional factors, such as the vehicle dimensions and the trailer dimensions, which may be stored in memory (e.g., memory 510).

The ideal hitch location may also be determined by identifying, by the ECU, one or more lines associated with a parking space and determining, by the ECU, a trailer movement to align the trailer with the one or more lines associated with the parking space. The ideal hitch location is the location of the hitch that causes the trailer movement to align the trailer with the one or more lines associated with the parking space.

The ECU instructs the one or more actuators to move the hitch along the track to the ideal hitch location (step 606). The one or more actuators may move the hitch along the track using a rail (e.g., rail 220) parallel to the track and having threads (e.g., threads 222) located on an outer surface of the rail. The hitch may be coupled to a first sleeve (e.g., sleeve 216) that receives the track and a second sleeve (e.g., sleeve 218) that receives the rail. The second sleeve has corresponding threads located on an inner surface (e.g., inner surface 224) of the second sleeve and engage the threads of the rail. The second sleeve may be turned by the one or more actuators, with the rail remaining stationary, causing the hitch to move along the track. Alternatively, the rail may be turned by the one or more actuators, with the second sleeve remaining stationary, causing the hitch to move along the track.

The one or more actuators may move the hitch along the track using a pneumatic or hydraulic cylinder (e.g., cylinder 240) attached to an arm (e.g., arm 242) of variable length. The length of the arm may be controlled by the pneumatic or hydraulic cylinder. The hitch may be coupled to a first sleeve (e.g., sleeve 216) that receives the track and the hitch may also be coupled to the arm. Thus, the cylinder is capable of controlling the location of the hitch along the track.

The one or more actuators may move the hitch along the track using a rail (e.g., rail 230) having a plurality of teeth (e.g., teeth 232) located along the rail. The hitch may be coupled to a sleeve (e.g., sleeve 216) that receives the track. The hitch may be coupled to one or more gears (e.g., gear 234) with corresponding teeth (e.g., teeth 236) for engaging the teeth of the rail. The one or more gears may be turned by the one or more actuators, with the rail remaining stationary, causing the hitch to move along the track.

As used herein, "substantially" may refer to being within plus or minus 10% of the value.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A system for adjusting a trailer attached to a vehicle, the system comprising:
    a hitch located on a track along a rear end of the vehicle and configured to couple the vehicle to the trailer and move along the track;
    one or more actuators coupled to the hitch and configured to move the hitch along the track;
    one or more rear corner sensors configured to detect sensor data including information related to proximity of the trailer to one or more corresponding corners of the vehicle; and
    an electronic control unit (ECU) coupled to the one or more actuators and the one or more rear corner sensors and configured to cause the one or more actuators to move the hitch along the track based on the sensor data.

2. The system of claim 1, further comprising one or more sensors configured to detect additional sensor data indicating a location and an orientation of the trailer relative to the vehicle, and
    wherein the ECU is further configured to determine an ideal hitch location based on the additional sensor data and cause the one or more actuators to move the hitch to the ideal hitch location.

3. The system of claim 2, wherein the one or more sensors include a rear-view camera configured to detect image data of an environment behind the vehicle.

4. The system of claim 2, wherein the one or more sensors include one or more rear parking clearance sensors configured to detect proximity of the trailer to the rear end of the vehicle.

5. The system of claim 2, wherein the one or more sensors include an angle detection sensor configured to detect an angle of the trailer relative to the vehicle.

6. The system of claim 2, further comprising a vehicle speed sensor configured to detect a vehicle speed, and
    wherein the ECU is further configured to determine the ideal hitch location based on the additional sensor data and the vehicle speed.

7. The system of claim 2, further comprising a location sensor configured to detect location data associated with the vehicle, and
    wherein the ECU is further configured to determine the ideal hitch location based on the additional sensor data and the location data.

8. The system of claim 1, wherein the one or more actuators are configured to move the hitch along the track using a rail parallel to the track and having threads.

9. The system of claim 1, wherein the one or more actuators are configured to move the hitch along the track using a pneumatic or hydraulic cylinder.

10. The system of claim 1, wherein the one or more actuators are configured to move the hitch along the track using a rail parallel to the track and having teeth for engaging a gear coupled to the hitch.

11. A vehicle coupled to a trailer, the vehicle comprising:
    a hitch located on a track along a rear end of the vehicle and configured to couple the vehicle to the trailer and move along the track;
    one or more actuators coupled to the hitch and configured to move the hitch along the track;
    one or more rear corner sensors configured to detect sensor data including information related to proximity of the trailer to one or more corresponding corners of the vehicle; and
    an electronic control unit (ECU) coupled to the one or more actuators and the one or more rear corner sensors and configured to cause the one or more actuators to move the hitch along the track based on the sensor data.

12. The vehicle of claim 11, further comprising one or more sensors configured to detect additional sensor data indicating a location and an orientation of the trailer relative to the vehicle, and
    wherein the ECU is further configured to determine an ideal hitch location based on the additional sensor data and cause the one or more actuators to move the hitch to the ideal hitch location.

13. The vehicle of claim 12, wherein the one or more sensors include at least one of:
    a rear-view camera configured to detect image data of an environment behind the vehicle,
    one or more rear parking clearance sensors configured to detect proximity of the trailer to the rear end of the vehicle, or
    an angle detection sensor configured to detect an angle of the trailer relative to the vehicle.

14. The vehicle of claim 12, further comprising a vehicle speed sensor configured to detect a vehicle speed, and
    wherein the ECU is further configured to determine the ideal hitch location based on the additional sensor data and the vehicle speed.

15. The vehicle of claim 12, further comprising a location sensor configured to detect location data associated with the vehicle, and
    wherein the ECU is further configured to determine the ideal hitch location based on the additional sensor data and the location data.

16. The vehicle of claim 11, wherein the one or more actuators are configured to move the hitch along the track using a rail parallel to the track and having threads, move the hitch along the track using a pneumatic or hydraulic cylinder, or move the hitch along the track using a rail parallel to the track and having teeth for engaging a gear coupled to the hitch.

17. A method for adjusting a trailer attached to a vehicle, the method comprising:

detecting, by one or more sensors including at least one rear parking clearance sensor configured to detect information related to proximity of the trailer to a rear end of the vehicle, sensor data indicating a location and an orientation of the trailer relative to the vehicle;

determining, by an electronic control unit (ECU) coupled to the one or more sensors and one or more actuators and based on the sensor data, an ideal hitch location of a hitch located on a track along a rear end of the vehicle and configured to couple the vehicle to the trailer and move along the track; and causing, by the ECU, the one or more actuators to move the hitch to the ideal hitch location.

18. The method of claim 17, further comprising:

identifying, by the ECU and based on the sensor data, potential contact between the vehicle and the trailer; and determining, by the ECU, a hitch movement to avoid the potential contact between the vehicle and the trailer, and wherein determining the ideal hitch location includes determining the ideal hitch location based on the hitch movement to avoid the potential contact between the vehicle and the trailer.

19. The method of claim 17, further comprising:

identifying, by the ECU, one or more lines associated with a parking space; and determining, by the ECU, a trailer movement to align the trailer with the one or more lines associated with the parking space, and wherein determining the ideal hitch location includes determining the ideal hitch location based on the trailer movement to align the trailer with the one or more lines associated with the parking space.

* * * * *